W. V. TURNER.
FLUID PRESSURE BRAKE.
APPLICATION FILED NOV. 15, 1905.

1,109,715.

Patented Sept. 8, 1914.
4 SHEETS—SHEET 1.

W. V. TURNER.
FLUID PRESSURE BRAKE.
APPLICATION FILED NOV. 15, 1905.

1,109,715.

Patented Sept. 8, 1914.
4 SHEETS—SHEET 2.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,109,715. Specification of Letters Patent. Patented Sept. 8, 1914.

Application filed November 15, 1905. Serial No. 287,527.

*To all whom it may concern:*

Be it known that I, WALTER V. TURNER, a citizen of the United States, residing in Wilkinsburg, in the county of Allegheny and State of Pennsylvania, have invented a certain new and useful Improvement in Fluid-Pressure Brakes, of which the following is a specification.

This invention relates to fluid pressure brake systems particularly adapted for locomotives or other railway vehicles, and is in the nature of an improvement on that covered by my prior pending applications, Ser. No. 227,222, filed Oct. 5, 1904, and Ser. No. 244,265, filed Feb. 6, 1905.

One of the objects of my present improvement is to simplify the construction of the distributing valve mechanism which governs the supply of air to the brake cylinder, eliminating certain parts and providing means for steadying the action of the device.

Another object is to provide a blow-down valve for the regulating or application chamber of the distributing valve device, the pressure in which governs the brake cylinder pressure, and to so connect said blow-down valve that communication therethrough from said chamber is normally closed, but adapted to be open in service applications, and also in emergency applications, if desired, through a restricted port, whereby the brake cylinder pressure may be limited to a predetermined degree in service applications and may be gradually reduced from a higher degree in emergency applications.

Another object is to provide an improved engineer's brake valve having ports and connections with the distributing valve device and train pipe adapted to supply air through the feed valve to the train pipe in one position, called running position, in which the outlet port from the application chamber is open, and also in another position, in which the outlet from the said chamber is closed, and which may be termed "holding" position, whereby the engine brakes and the train brakes may be released at the same time and the train pipe recharged or the train brakes may be released and the train pipe recharged while holding the engine brakes applied for any desired period of time.

My present invention also contemplates holding the application chamber closed and the engine brakes applied in the full release position of the engineer's brake valve, in which air under high pressure from the main reservoir is turned directly into the train pipe, substantially the same as set forth in my previous application.

A further object of the present invention is to provide an improved combined automatic and straight air brake equipment for locomotives, in which the straight air brake valve is interposed in the connections between the distributing valve device and the engineer's brake valve of the automatic system, whereby the engine brakes may be released and applied with straight air independent of the automatic train brakes and without manipulating the engineer's brake valve.

Another feature of my improvement comprises a double cut out cock connection in the train pipe and the application chamber pipe, whereby when the train pipe is cut off from the engineer's brake valve on the second locomotive in double heading the said application chamber will exhaust automatically through its triple valve connection and the automatic brake on the second engine be thereby controlled by the engineer's brake valve of the head engine by varying the train pipe pressure in the usual manner.

In the accompanying drawings, which illustrate one form of apparatus embodying my improvements.

Figures 1, 2:
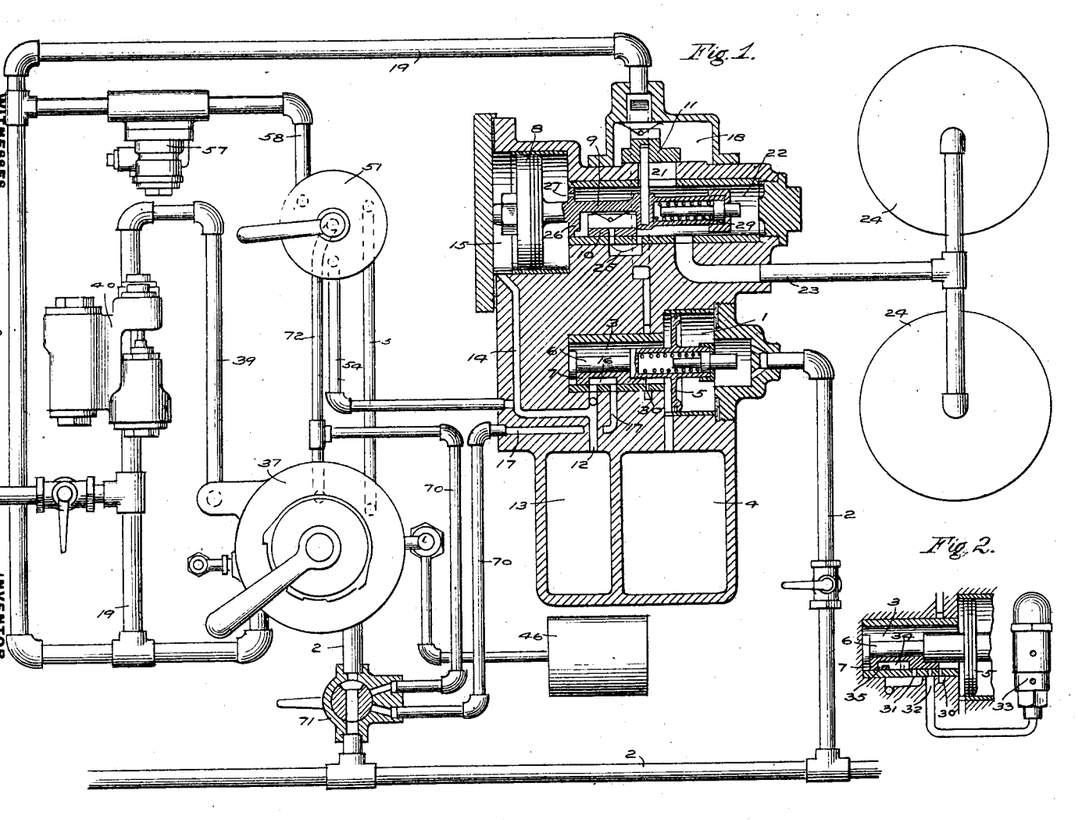
Figure 1 is a diagrammatic view of the improved equipment adapted to be applied to locomotives, the distributing valve mechanism being shown in section.
Fig. 2 another sectional view of the triple valve portion of the distributing valve mechanism taken in a different plane and showing the blow-down valve and its connections.

According to the construction shown, the distributing valve mechanism comprises a triple valve portion having a piston chamber 1 communicating with the train pipe 2, valve chamber 3 communicating with the auxiliary pressure chamber 4, piston 5, stem 6, and slide valve 7, and the brake cylinder supply and release valve mechanism composed of piston 8 with stem 9, release valve 10 and supply valve 11.

The slide valve 7 of the triple valve controls a port 12 through which air may be supplied to the regulating or application chamber 13, which communicates by a port 14 with the chamber 15 on one side of piston 8, while the cavity 16 in the valve 7 is adapted to connect the application chamber and port 14 with the exhaust port 17.

The main supply valve 11 is preferably operated directly by the stem 9 of piston 8 and controls the supply of air from the main reservoir 20, pipe 19, and chamber 18 through port 21 to the chamber 22 on the opposite side of piston 8, and to the brake cylinders 24 through a suitable passage and pipe connections 23.

Any number of brake cylinders may be supplied in this manner, and I propose to connect this pipe not only with the driver brake cylinders but also with the truck and tender brakes.

It will now be seen that the piston 8 is subject to the opposing pressures of the application chamber on one side and the brake cylinder on the other, and that it operates to supply the brake cylinder with the same degree of pressure that may be admitted to the application chamber. It also serves, through release valve 10 and exhaust port 25, to diminish or release the brake cylinder pressure according as the pressure in the application chamber may be reduced or released.

In order to prevent a too rapid accumulation of pressure upon the brake cylinder side of piston 8 when the supply valve is opened, which might cause a fluttering or rapid vibrating movement of the same, means are provided for retarding the flow of air against the piston 8, such as a flange or collar 26 mounted on the stem 9 and having one or more perforations or ports 27.

A spring 29 may be employed for assisting the closing movement of supply valve 11 when the pressures equalize upon the piston 8.

The pressure chamber is preferably charged through a small port 30 located in the seat of the slide valve 7 and communicating with the main reservoir or other source of supply. When charged to a degree equal to or slightly greater than the train pipe pressure the piston 5 moves the slide valve 7 out sufficiently to close this charging port.

In order to prevent the accumulation of an excessive pressure in the application chamber, and consequently in the brake cylinder, in service applications of the brake, a blow-down valve set to open at the desired degree of pressure may be connected to said application chamber, either directly or through the triple valve device.

According to the arrangement shown in Fig. 2 of the drawing, the valve seat is provided with a port 31 communicating with the application chamber 13 and a port 32 leading to the blow-down valve 23, while the valve 7 has an additional cavity 34 adapted to connect ports 31 and 32 in service position. By this means the brake cylinder pressure is limited to the desired degree in service applications, and the blow-down valve may also be connected with the application chamber through a restricted port 35 in emergency position for permitting a gradual blowing off of the pressure in emergency applications. In this position also a very small port 36 in the slide valve may register with the feed port 30 for the purpose of insuring the maintenance of the desired degree of pressure in the chambers 4 and 13 in emergency applications.

The main reservoir pipe 19 is connected to the rotary valve chamber of the engineer's brake valve 37, the valve seat of which is preferably provided with the following ports; inlet port 38 for air at train pipe pressure admitted through feed valve 40 and pipe 39, train pipe port 41, feed port 42 leading to the train pipe port or passage, exhaust port 43 leading to the atmosphere, preliminary discharge port 44 communicating with the chamber 45 of the customary equalizing reservoir 46, equalizing port 47 also leading to the chamber 45, and a port 48 communicating with the application chamber 13.

Where the engineer's brake valve is used alone the port 48 may communicate directly with the application chamber, but where a straight air brake valve is also employed this port preferably communicates by a pipe 50 with a port 52 in the seat of the straight air brake valve 51, which also has a port 53 communicating through pipe 54 with the application chamber 13, exhaust port 56, and port 55 through which air is supplied from the main reservoir through the reducing valve 57 and pipe 58. This reducing valve is adjusted to limit the maximum degree of pressure which may be admitted to the application chamber and consequently to the brake cylinder in straight air applications, to any desired amount.

Figures 7, 8, 15, 16:
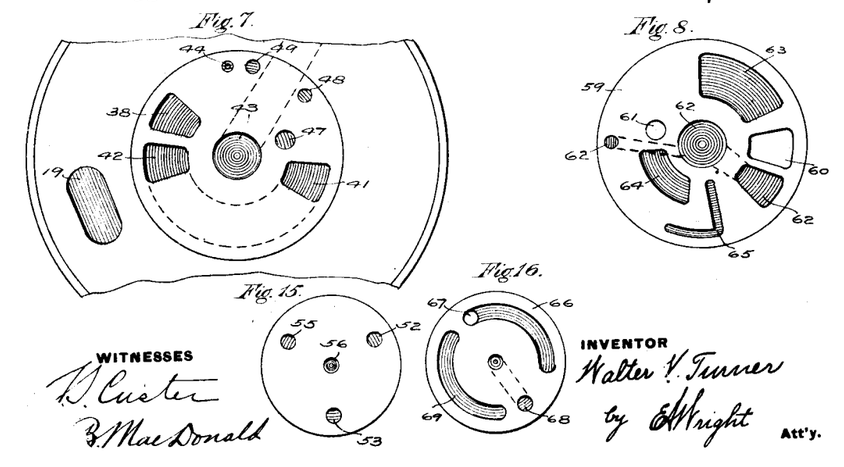
Fig. 7 a plan view of the rotary valve seat of the engineer's brake valve.
Fig. 8 a face view of the rotary valve of the engineer's brake valve.
Fig. 15 a plan view of the valve seat of the straight air brake valve.
Fig. 16 a face view of the rotary valve of the straight air brake valve.

The rotary valve 59 of the engineer's brake valve may be provided with through ports 60 and 61, and cavities 62, 63, 64 and 65, while the rotary valve 66 of the straight air brake valve 51 has a port 67 and cavities 68 and 69.

The pipe 70 leading from the exhaust port 17 is provided with a cock for normally closing the same when used on single locomotives, or on the head locomotive in double heading, but adapted to be opened on the second or following locomotives for the purpose of enabling the head engineer to release the brake on the second locomotive by the usual increase in train pipe pressure. As this cock is to be turned at the same time as the cut-out cock in the train pipe, it is preferable to combine them both in one double cock 71, and so arrange the ports as to close communication through pipe 70 and open communication through the train pipe in one position, and to open communication through pipe 70 and cut out the engineer's brake valve from the train pipe in another position. Although this pipe 70 may open directly to the atmosphere, it is preferred to connect the same with an additional port 49 in the seat of the engineer's brake valve for a purpose which will hereinafter be explained. A pipe 72 may also be employed for connecting the exhaust port 56 of the straight air brake valve with this port 49 in the engineer's brake valve.

Figures 3, 4, 5, 6:
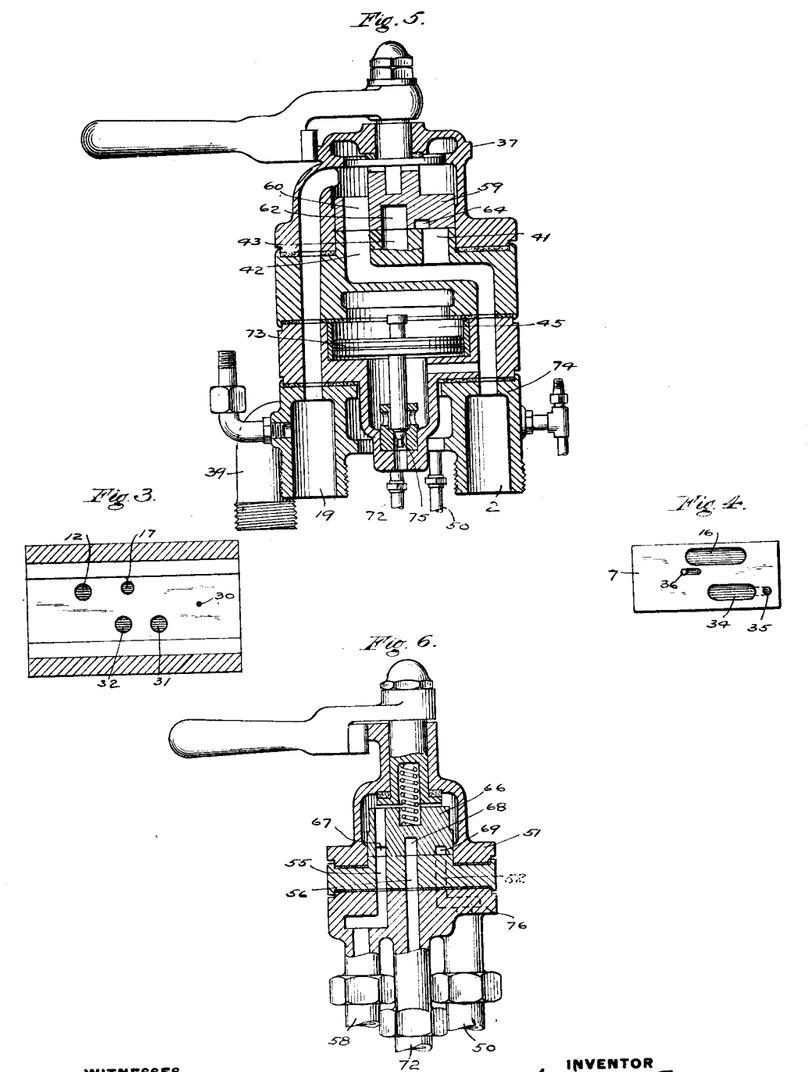
Fig. 3 a plan view of the slide valve seat of the triple valve of the distributing valve mechanism.
Fig. 4 a face view of the slide valve of said triple valve device.
Fig. 5 a vertical section of the engineer's brake valve of the automatic brake system.
Fig. 6 a vertical section of the straight air brake valve.

The engineer's brake valve is preferably bolted or otherwise secured to a fixed base section 74 containing suitable ports and passages to which all the pipe connections are made, whereby the brake valve proper, which may be formed in a plurality of sections having a valve seat with suitable ports and passages for communicating with corresponding passages in the base section, and also containing equalizing reservoir chamber 45 with piston 73 and train pipe discharge valve 75, may be readily removed and replaced without disturbing the pipe connections. The straight air brake valve 51 may also be formed in separable sections and secured in a similar manner to the fixed base section 76 having suitable passages to which the pipes 50, 58, 54 and 72 are connected.

Figure 17:
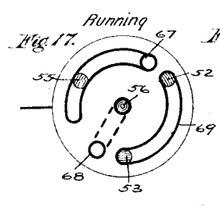
Figs. 17 to 20 diagrams illustrating the ports of the straight air brake valve in running, release, lap, and application positions respectively.

With the main reservoir charged in the usual manner and the brake valves in running position, as indicated in the diagrams, Figs. 16 and 17, air flows from pipe 19 through the feed valve 40, set at the desired maximum degree of train pipe pressure, to pipe 39 and port 38 in the valve seat of the engineer's brake valve and thence to the train pipe 2 through cavity 63 and ports 42 and 41, and also to the equalizing reservoir 46 through cavity 64 and equalizing port 47, charging the same to the desired normal degree of pressure. Air from the main reservoir also flows to the supply valve chamber 18, and through reducing valve 57, pipe 58, and ports 55 and 67 to the chamber of the straight air brake valve 51.

From the train pipe air flows into the piston chamber 1 of the triple valve portion of the distributing valve device, moving the piston 5 and slide valve 7 to the extreme inner position shown in Fig. 1. Air then feeds through port 30 into the valve chamber 3 and pressure chamber 4, charging the same to a degree of pressure equal to or slightly greater than that of the train pipe, whereupon the piston 5 moves the slide valve outward a slight distance, merely sufficient to close the feeding in port 30. The application chamber 13 will then be open to the atmosphere through ports 12 and 14, pipe 54, port 53, cavity 69 and port 52 in the straight air brake valve, pipe 50, port 48, exhaust cavity 62 and exhaust port 43 of the engineer's brake valve; and the brake cylinders 24 with valve chamber 22 will also be in communication with the atmosphere through exhaust port 25.

Figure 12:
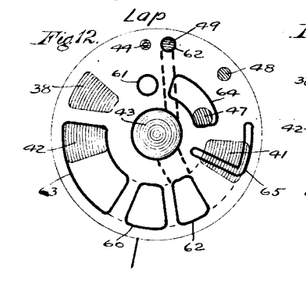
Figure 13:
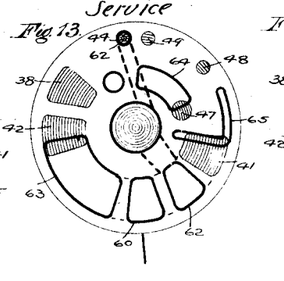

When the engineer's brake valve is turned to service application position, Fig. 13, the preliminary discharge port 44 communicates through one portion of exhaust cavity 62 with the exhaust port 43 and air from the equalizing chamber 45 and reservoir 46 discharges to the atmosphere. After the desired reduction has been made in the equalizing chamber 45 and reservoir 46 the engineer's brake valve is turned to lap position, Fig. 12, thereby closing the preliminary discharge port. The higher pressure of the train pipe beneath the equalizing piston 73 opens the train pipe discharge valve 75 and the train pipe pressure is reduced to the same degree in the usual manner. This reduction in train pipe pressure causes the customary action of the triple valves in applying the automatic train brakes upon the cars, and also causes piston 5 to move the slide valve 7 to open the service port 12 and supply air from the pressure chamber 4 to the application chamber 13, see Fig. 21. As the port 48 is now closed at the engineer's brake valve no air can escape from the application chamber and the desired degree of brake cylinder pressure then accumulates in chamber 15 on piston 8, causing the same to move the valve 10 to close the brake cylinder exhaust port 25, and the supply valve 11 to open the port 21 and supply air to the chamber 22 and the brake cylinders 24 of the locomotive.

Figure 21:
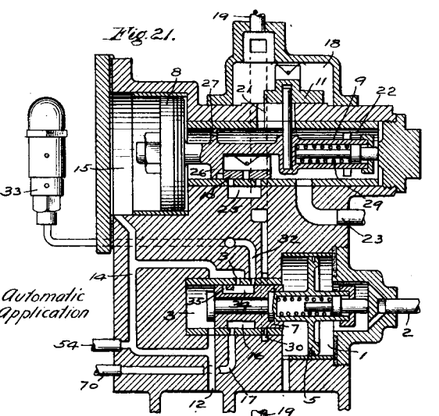
Figs. 21 to 24 diagrams in section illustrating the distributing valve mechanism in the respective positions of service application automatic, lap automatic, emergency automatic, and straight air application, the slide valve 7 being indicated in two parts, one above and one below the piston stem, in order to show all the ports in one sectional view.

As the air flows through the supply port 21, the tendency to build up pressure more rapidly on the face of piston 8 than in the brake cylinder is prevented by the perforated flange 26, which retards the rise in pressure on the brake cylinder side of the piston and prevents any rapid vibrations of the piston.

Figure 22:
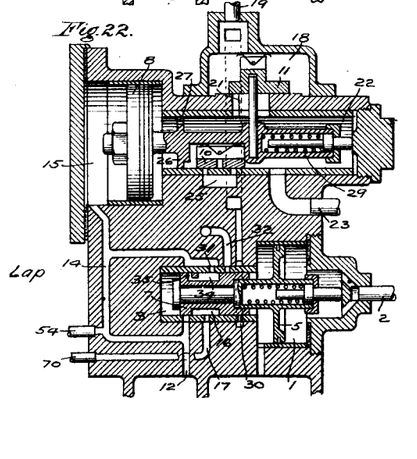

It will be noticed that in this service application position, the cavity 34 of the valve 7 connects the application chamber through ports 31 and 32 with the blow-down valve 33, so that any excess pressure which may be admitted to the application chamber above the desired maximum degree of brake cylinder pressure to which the blow-down valve is adjusted, will be blown off to the atmosphere. When the train pipe pressure has diminished to a degree equal to that of the equalizing reservoir and the train pipe discharge valve closes in the usual manner, the pressure in chamber 4 diminishes by expansion into application chamber 13 until the pressure on the valve chamber side of piston 5 is substantially equal to the train pipe pressure, whereupon the graduating spring acts to move the valve 7 to lap position and close port 12 and port 32, as indicated in Fig. 22. At the same time the brake cylinder pressure which also obtains in chamber 22 and on the face of piston 8 is substantially equal to that of the application chamber and chamber 15 on the opposite side of piston 8, so that the spring 29 operates to move the stem 9 and supply valve 11 back just far enough to close the supply port 21, but not far enough to open the exhaust port 25, there being preferably a small amount of lost motion between the stem 9 and the exhaust valve 10, in order to permit this lap movement of the supply valve without moving the exhaust valve. The brake cylinder pressure will then be maintained at the degree of pressure admitted to the application chamber, since, if there should be any leakage from the brake cylinder the pressure upon the piston 8 would operate the valve 11 to supply a sufficient amount of air to the brake cylinder to compensate for such leakage and maintain the brake cylinder pressure constant.

Figure 9:
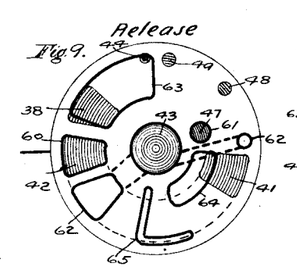
Figs. 9 to 14 diagrammatic views illustrating the relative positions of ports of the engineer's brake valve in release, running, holding, lap, service, and emergency positions respectively.
Figure 10:
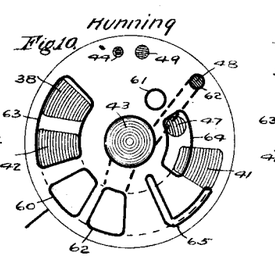

In order to release both the locomotive and the automatic train brakes the engineer's brake valve is placed in full release position, Fig. 9, for a limited period of time and then turned to running position, Fig. 10. In the release position, air from the main reservoir flows through ports 60 and 42 directly to the train pipe, raising the pressure therein and causing the triple valves of the car brakes to move to release position in the usual manner.

The pressure also increases in chamber 1 upon piston 5 and moves the slide valve 7 to its inner or release position, but the air under pressure in the application chamber cannot escape since the port 17 and pipe 70 is closed at the cock 71 and the port 48 is closed at the engineer's brake valve, consequently the engine brakes are held applied until the engineer's brake valve is turned to running position. This temporary holding on of the engine brakes tends to bunch the slack and prevents the violent surging forward of the head end of the train upon releasing brakes while running at slow speed, which has heretofore often resulted in a break-in-two of the train.

When the engineer's brake valve is turned to running position, the air from the application chamber is released to the atmosphere through port 48, cavity 62 and exhaust port 43, whereupon the brake cylinder pressure in chamber 22, acting on piston 8, moves the valve 10 to open the exhaust port 25 and the engine brake cylinders are released to the atmosphere. At the same time compressed air is admitted through the feed valve and ports 38 and 42 to recharge the train pipe to the normal degree.

Figure 11:
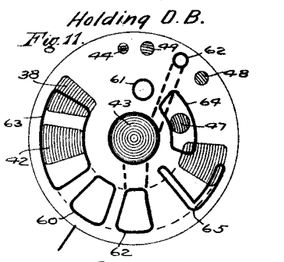

Should it be desired to hold the engine brakes applied for a longer period of time while the train brakes are released, the engineer's brake valve may be turned to the holding position, Fig. 11, in which the port 48 is closed and the pressure held in the application chamber and the engine brake cylinders, while at the same time the train pipe is being recharged by air supplied through the feed valve and ports 38 and 42 to the train pipe. The engine brake cylinder pressure may then be graded down to any degree desired by simply moving the engineer's brake valve to running position and then back to holding position, thereby reducing the pressure of the application chamber, whereupon the higher degree of brake cylinder pressure acting on piston 8 opens the exhaust port 25 and allows the brake cylinder pressure to reduce to substantially the same degree when the piston closes the exhaust valve 10.

It will therefore be seen that the engine brake cylinder pressure may be graded up or down at will by merely increasing or diminishing the pressure in the application chamber.

Figure 14:
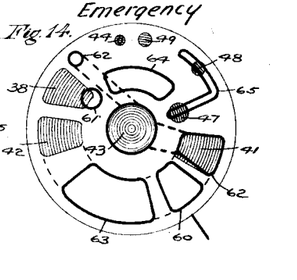
Figure 23:
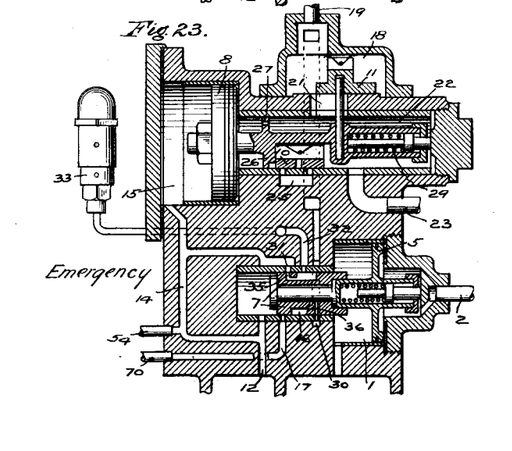

To produce an emergency application of the brakes, the engineer's brake valve is turned to the emergency position, Fig. 14, in which communication is open directly from the train pipe port 41 to the atmosphere through the large portion of the cavity 62 and the exhaust port 43, thereby producing a sudden reduction in train pipe pressure and causing quick action of the triple valves of the automatic train brakes in the usual manner. This sudden reduction in train pipe pressure also causes the piston 5 to move the valve 7 outward to its extreme position, illustrated in Fig. 23, in which the port 12 is wide open, while the pressure chamber 4 is supplied with air from the main reservoir through the port 30 and restricted port 36, and the application chamber communicates through the restricted port 35 with the blow-down valve 33. This additional supply of air through restricted port 36 tends to raise the equalized pressure of the pressure chamber 4 and the application chamber 12, while the valve 33 permits a slow and gradual blowing down of the excess pressure from the application chamber through port 35.

In order to further increase the pressure and volume of the application chamber in emergency applications, a cavity 65 in the engineer's brake valve may be employed for establishing communication from a reservoir, such as the equalizing reservoir, through ports 47 and 48 to the pipe leading to the application chamber.

When a straight air brake valve is also employed in connection with the engineer's brake valve a complete independent control of the engine brakes and the automatic train brakes is obtained.

Figure 20:
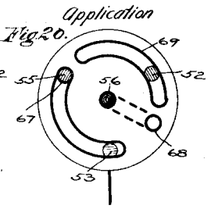
Figure 24:
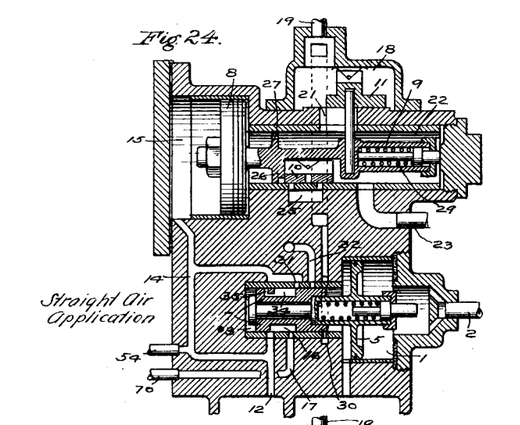

If it be desired to apply the engine brakes without applying the automatic train brakes, the straight air brake valve is turned to the application position, Fig. 20, in which communication from the engineer's brake valve or pipe 50 to the application chamber is cut off and air from the reducing valve 57 and pipe 58 is supplied through ports 55, 67 and 53 and pipe 54 to the application chamber 13 of the distributing valve mechanism, the piston 8 of which then operates to move valve 11 to open port 21, as indicated in Fig. 24, and supply the brake cylinders with air at the same degree of pressure as previously explained. The straight air brake valve may then be turned to lap position, Fig. 19, with all ports closed, whereupon the valve 11 laps the port 21 and the engine brakes may be thus held applied as long as desired.

By turning the straight air brake valve to running position and back to lap, the engine brake cylinder pressure may be graded down or released at will, since in running position the application chamber is open to the atmosphere through pipe 54, ports 53, 69 and 52, pipe 50 and ports 48, 62 and 43 in the engineer's brake valve.

Figures 18, 19:
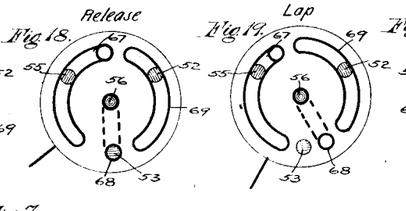

When the brakes of both engine and train have been applied by the automatic system with the engineer's brake valve which then stands in lap position, Fig. 12, the engine brakes may be released without interfering with the automatic train brakes by turning the straight air brake valve to release position, Fig. 18, in which the application chamber is discharged to the atmosphere through pipe 54, ports 53, 68 and 56 in the straight air brake valve, pipe 72 and ports 49, 62 and 43 in the engineer's brake valve.

The engine brakes may then be independently applied by turning the straight air brake valve to application position and back to lap, while the automatic train brakes may be released by turning the engineer's brake valve to release and running positions, thus giving a complete and independent control of the engine brakes and the automatic train brakes.

When two or more engines are used for pulling a train, commonly called double heading, the engineer's brake valve on the second engine is placed in lap position and the cock 71 turned to cut off communication with the train pipe. This also opens communication through pipe 70, which may lead to the atmosphere or, preferably, as shown, to the port 49 in the engineer's brake valve.

The brakes on the second engine may then be applied and released with the automatic train brakes in the usual manner by operating the engineer's brake valve on the head engine, since upon an increase in train pipe pressure after an application, the valve 7 moves to release position in which cavity 16 connects the ports 12 and 17, and air from the application chamber is released to the atmosphere through pipe 70 and ports 49, 62 and 43 in the engineer's brake valve which stands in lap position, and the piston 8 then operates the valve 10 to release the brake cylinders as previously explained.

If, for any reason, the engineer of the second engine should desire to apply or release his engine brakes independently of the control by the engineer's brake valve of the head engine, he may set his engineer's brake valve in running position in order to close pipe 70 and port 49 and open port 48, and then turn his straight air brake valve either to application position or to release position and thereby apply or release the brakes of the second engine independently of the head engine or the automatic train brakes.

If the engineer should inadvertently leave the handle of the straight air brake valve in release position, it would not interfere with the emergency application, since the exhaust port 56 is connected by pipe 72 with port 49 of the engineer's brake valve and both these ports 48 and 49 are closed when the engineer's brake valve is turned to emergency position, thereby preventing any escape of air from the application chamber.

My improved apparatus has the advantages of securing a complete and independent control of the engine brakes and the automatic train brakes, maintaining the pressure in all the engine brake cylinders constant regardless of leakage or the length of piston travel, limiting the degree of engine brake cylinder pressure to the desired amount in service applications, producing a greater brake cylinder pressure and gradually blowing the same down in emergency applications, and providing for either simultaneous or independent control of the brakes on the second engine in double heading.

Having now described my invention, what I claim as new and desire to secure by Letters Patent is:—

1. In a fluid pressure brake, the combination with a brake cylinder and train pipe of a valve for controlling the supply of air to the brake cylinder to apply the brake, an application or regulating chamber separated from the train pipe, a movable abutment connected to said valve and subject to the pressure of the application chamber, and means for supplying and releasing air to and from the application chamber to vary the degree of pressure therein.

2. In a fluid pressure brake, the combination with a brake cylinder, of a valve for controlling the supply of air to the brake cylinder to apply the brake, an application chamber separated from the train pipe, a movable abutment subject to the opposing pressures of the application chamber and the brake cylinder and operated by an increase in pressure in the application chamber for moving said valve to apply the brakes, and means for varying the pressure in said application chamber.

3. In a fluid pressure brake, the combination with a brake cylinder, of a valve for controlling the supply of air to the brake cylinder, an application or regulating chamber normally at atmospheric pressure and separated from the train pipe, a movable abutment connected to said valve and subject to the pressure of the application chamber, a brake cylinder release valve operated by said abutment and means for supplying and releasing air to and from the application chamber.

4. In a fluid pressure brake, the combination with a brake cylinder, of a valve for controlling the supply of air to the brake cylinder, an application chamber separated from the train pipe, a movable abutment subject to the opposing pressures of the application chamber and the brake cylinder for moving said valve to apply the brakes upon an increase in pressure in the application chamber, a brake cylinder release valve operated by said abutment, and means for supplying air to and releasing same from the application chamber.

5. In a fluid pressure brake, the combination with a train pipe, and brake cylinder, of a valve for controlling the supply of air to the brake cylinder, an application chamber, a movable abutment subject to the opposing pressures of the application chamber and the brake cylinder for moving said valve, and a valve mechanism operated by variations in train pipe pressure for varying the pressure in said application chamber.

6. In a fluid pressure brake, the combination with an application chamber and a valve mechanism governed by the pressure in said chamber for controlling the brake cylinder pressure, of a blow-down valve adapted to be connected to the application chamber for releasing air therefrom when the pressure rises above a predetermined degree.

7. In a fluid pressure brake, the combination with an application chamber, means for supplying air thereto, and a valve mechanism governed by the pressure in said chamber for controlling the supply of air to the brake cylinder, of a blow-down valve, and means establishing communication from said chamber to the blow-down valve for limiting the pressure therein to a predetermined degree.

8. In a fluid pressure brake, the combination with an application chamber, means operated by a reduction in train pipe pressure for supplying air to said chamber, and a valve mechanism governed by the pressure in said chamber for controlling the supply of air to the brake cylinder, of a blow-down valve normally disconnected from said chamber, and means operated by reduction in train pipe pressure in service applications for opening communication from said chamber through said blow-down valve.

9. In a fluid pressure brake, the combination with an application chamber, and a valve mechanism governed by the pressure in said chamber for controlling the supply of air to the brake cylinder, of a blow-down valve for said chamber, and a triple valve device operated by train pipe pressure for supplying air to said chamber and controlling communication from said chamber to the blow-down valve.

10. In a fluid pressure brake, the combination with an application chamber, and a valve mechanism governed by the pressure in said chamber for controlling the supply of air to the brake cylinder, of a blow-down valve for said chamber, an auxiliary pressure chamber, and a valve device operated by train pipe pressure for controlling communication from the pressure chamber to the application chamber, and from said latter chamber to the blow-down valve.

11. In a fluid pressure brake, the combination with an application chamber, and a valve mechanism governed by the pressure in said chamber for controlling the supply of air to the brake cylinder, of a blow-down valve for said chamber, an auxiliary pressure chamber, and valve mechanism operating upon a sudden reduction in train pipe pressure in emergency applications to open communication from the pressure chamber to the application chamber, from the latter chamber to the blow-down valve, and from a source of supply to the pressure chamber.

12. A distributing valve device comprising a valve for controlling the supply of air to the brake cylinder, an application chamber, a movable abutment subject to the opposing pressures of the application chamber and the brake cylinder for opening said valve, and means for retarding the flow of air from the source of supply to the brake cylinder side of said movable abutment.

13. A distributing valve device comprising a valve for controlling the supply of air to the brake cylinder, an application chamber, a movable abutment subject to the opposing pressures of the application chamber and the brake cylinder and having a stem for moving said valve, and a perforated collar on said stem for retarding the flow of air from the source of supply to the brake cylinder side of said abutment.

14. In a fluid pressure brake, the combination with an application chamber and valve mechanism operated by an increase in pressure in said chamber for supplying air to the brake cylinder, of a train pipe, a feed valve device therefor, and an engineer's brake valve having ports adapted in one position to supply air through the feed valve to the train pipe and to close the outlet from the application chamber.

15. In a fluid pressure brake, the combination with an application chamber and a valve mechanism governed by the pressure in said chamber for controlling the supply of air to the brake cylinder, of a train pipe, a feed valve device therefor, and an engineer's brake valve having ports adapted in one position to supply air through the feed valve to the train pipe and to close the outlet from the application chamber, and in another position to supply air through the feed valve to the train pipe and to open the outlet from the application chamber.

16. In a fluid pressure brake, the combination with an application chamber, and valve mechanism governed by the pressure in said chamber for controlling the supply of air to the brake cylinder, of a triple valve device operated by a reduction in train pipe pressure for supplying air to said application chamber, and an engineer's brake valve having ports adapted in one position to reduce the train pipe pressure and to supply air from another source to the application chamber.

17. In a fluid pressure brake, the combination with an application chamber, and a valve mechanism governed by the pressure in said chamber for controlling the supply of air to the brake cylinder, of a triple valve device operated by a reduction in train pipe pressure for supplying air to said application chamber, an equalizing reservoir, and an engineer's brake valve having ports adapted in the emergency position to open communication from the train pipe to the atmosphere and from the equalizing reservoir to said application chamber.

18. In a fluid pressure brake, the combination with an application chamber, and valve mechanism governed by the pressure in said chamber for controlling the supply to the brake cylinder, of an engineer's brake valve having a train pipe connection and a port adapted to be connected with the application chamber, a valve device operated by variations in train pipe pressure for supplying air to said application chamber, and a straight air brake valve having means for supplying air to the application chamber and for controlling communication from the application chamber to the engineer's brake valve.

19. In a fluid pressure brake, the combination with an application chamber and a valve mechanism governed by the pressure in said chamber for controlling the supply to and release from the brake cylinder, of an engineer's brake valve having a train pipe connection and ports for releasing air from the application chamber in the running position, and a straight air brake valve having ports adapted in one position to supply air to said application chamber and in another position to open communication from said chamber to the engineer's brake valve.

20. In a fluid pressure brake, the combination with an application chamber and a valve mechanism governed by the pressure in said chamber for controlling the supply to and release from the brake cylinder, of an engineer's brake valve having a train pipe connection and ports for releasing air from the application chamber in lap position, and a straight air brake valve having ports for controlling communication from the application chamber to the engineer's brake valve.

21. In a fluid pressure brake, the combination with an application chamber, a valve mechanism governed by the pressure in said chamber for controlling the supply to the brake cylinder, and a triple valve device governed by the train pipe pressure for controlling the supply of air to and its release from said application chamber, of an engineer's brake valve, a cock for cutting out the engineer's brake valve from the train pipe, and means for closing and opening the outlet from the exhaust of the triple valve device.

22. In a fluid pressure brake, the combination with an application chamber, a valve mechanism governed by the pressure in said chamber for controlling the supply to the brake cylinder, and a triple valve device governed by the train pipe pressure for controlling the supply of air to and its release from said application chamber, of an engineer's brake valve and a double cut out cock for opening or closing the outlet from the exhaust of the triple valve device and communication from the train pipe to the engineer's brake valve.

23. In a fluid pressure brake, the combination with an application chamber, a valve mechanism governed by the pressure in said chamber for controlling the supply to the brake cylinder, and a triple valve device governed by the train pipe pressure for controlling the supply of air to and its release from said application chamber, of an engineer's brake valve, a pipe or passage connecting the exhaust from the triple valve device to the engineer's brake valve, and a cut-out cock for said pipe.

24. The combination with a brake valve formed in sections and having a flat valve seat with suitable ports and passages, of a plain fixed base section having corresponding passages and pipe connections, whereby the brake valve may be removed without disturbing the pipe connections.

25. The combination of an engineer's brake valve formed in sections having a valve seat with suitable ports and passages, and containing a chamber with a piston and train pipe discharge valve, of a plain fixed base section provided with corresponding passages and pipe connections, whereby the brake valve may be removed without disturbing any of the pipe connections.

26. In a fluid pressure brake, the combination with a brake cylinder and train pipe, of a valve for controlling the supply of air to the brake cylinder, an application chamber separated from the train pipe, a movable abutment subject to the pressure of the application chamber for actuating said valve, and a brake valve for varying the air pressure in said application chamber.

27. In a fluid pressure brake, the combination with a brake cylinder, of a valve for controlling the supply of air thereto, an application chamber normally containing fluid at atmospheric pressure, a movable abutment subject on the full area thereof to the opposing pressures of the application chamber and the brake cylinder for actuating said valve, and a brake valve for varying the pressure in said application chamber.

28. In a fluid pressure brake, the combination with a brake cylinder and train pipe, of an application chamber separated from the train pipe, a movable abutment subject to the pressure of said chamber, valve means actuated by said abutment for controlling the supply and release of air to and from the brake cylinder, and a brake valve having ports for supplying air to and releasing same from said application chamber.

29. In a fluid pressure brake, the combination with a brake cylinder, of an application chamber, a movable abutment subject to the opposing pressures of the application chamber and the brake cylinder, and valve means directly actuated by said abutment and having ports for supplying fluid to the brake cylinder upon an increase in pressure in the application chamber and for releasing fluid from the brake cylinder upon a reduction in pressure in the application chamber, said abutment and valve means having a lap position in which the application and release ports are closed.

In testimony whereof I have hereunto set my hand.

WALTER V. TURNER.

Witnesses:
R. F. EMERY,
J. B. MACDONALD.